Feb. 3, 1959     A. LEPPALA     2,872,566
CONTROL FOR ARC WELDERS
Filed Sept. 11, 1956
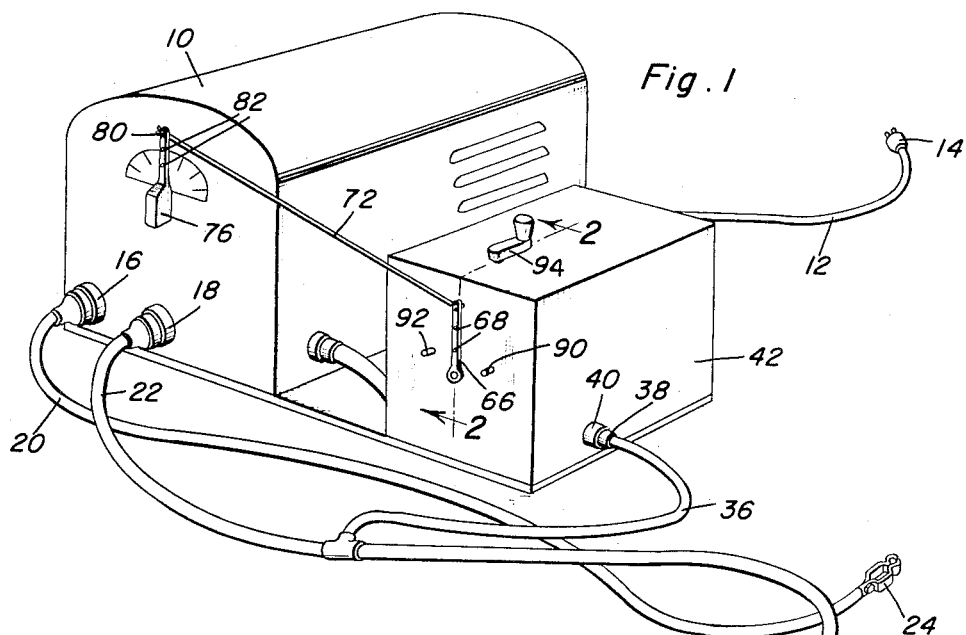
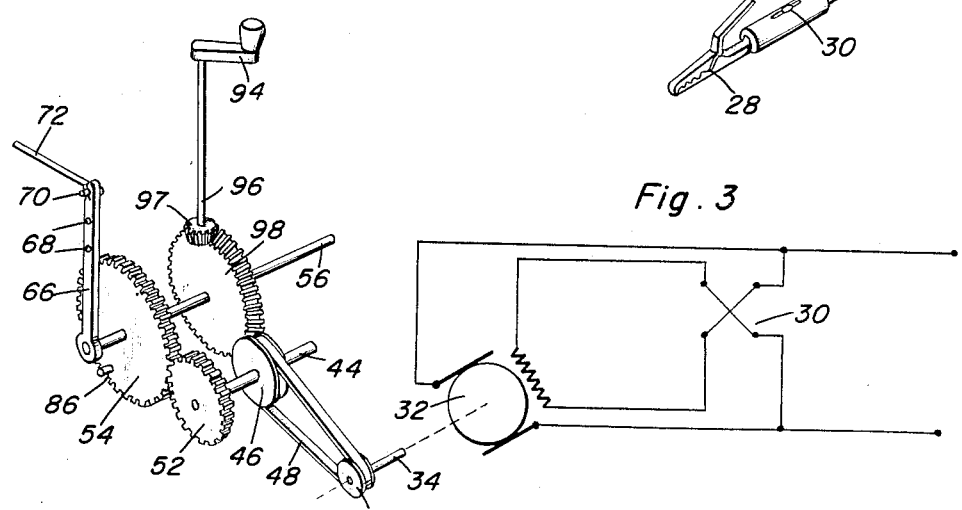
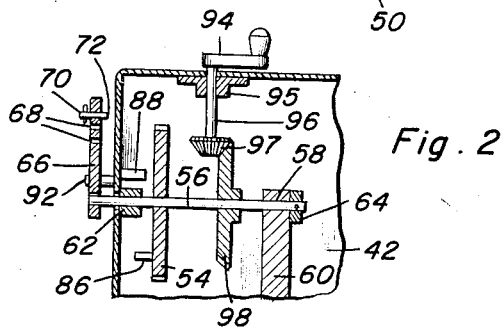
Alexander Leppala
INVENTOR.
BY *Clarence A. O'Brien*
*and Harvey B. Jackson*
Attorneys

2,872,566

CONTROL FOR ARC WELDERS

Alexander Leppala, Watton, Mich.

Application September 11, 1956, Serial No. 609,206

1 Claim. (Cl. 219—132)

This invention relates to arc welder controls and more particularly to an attachment for an arc welder which facilitates the use of the arc welder.

An object of the invention is to provide an attachment for an electric welder which is operative by a control remote from the welder, that is, a control preferably mounted on the welding rod holder, the attachment including a reversible motor under the influence of the control on the welding rod holder, the reversible motor being arranged to actuate an arm whose function is to move the standard amperage control on the arc welder. In this way, current selections, made necessary by changes in material that is to be welded or changes in the welding rods or other factors within the control of the man using the welder, may be made without returning to the electric welder.

A further object of the invention is to provide an attachment for an electric welder to serve the purpose of more easily selecting the desired amperage with which the welding operation is performed, the attachment being in the form of an easily portable unit which may be made a part of the electric welder or which may be maintained separate therefrom, but mechanically connected to the amperage control thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a standard electric welder having an attachment which is constructed in accordance with the invention applied operatively thereto;

Figure 2 is an enlarged, fragmentary sectional view taken approximately on the line 2—2 of Figure 1; and Figure 3 is a fragmentary, perspective view with the wiring diagram being shown schematically, this view showing principally the drive connection between the motor and arm that ultimately imparts movements to the amperage control of the electric welder.

In the accompanying drawing there is a standard electric welder 10 which is adapted to be actuated by any source of electrical energy that is commonly employed for such purpose. Therefore, there is a line 12 having a schematically represented plug 14 at the end thereof, this line being operatively connected with the transformer, rectifier and/or other standard components of the electric welder. In addition to the other standard structure of the electric welder, there are sockets 16 and 18 to which cables 20 and 22 are operatively connected. The cable 20 has a cable clamp 24 at its extremity, this clamp being adapted to be connected to the piece that is to be welded. Cable 22 has a plug on the end which is fitted in socket 18 and has a welding rod holder 28 on the opposite end. The welding rod holder is of substantially conventional formation, but is altered so as to include the switch 30 (Figure 3), which is wired in the circuit of reversible motor 32 in order to control the direction of movement of the motor shaft 34 thereof. Electric motor 32 is of standard construction, as is the wiring therefor. This wiring extends through a part of the cable 22 and cable 36 that has a plug 38 at its end fitted in socket 40, the latter being secured to casing 42. Motor 32 is located in the casing so as to have the motor and the entire attachment easily portable.

Although casing 42 is shown as separate from welder 10, it may be physically attached thereto if found expedient or desirable. A jack shaft 44 is mounted for rotation in bearings disposed in the casing 42 and has a pulley 46 thereon. Belt 48 is entrained around pulley 46 and pulley 50, the latter being secured to motor shaft 34. Pinion 52 is secured to jack shaft and is enmeshed with gear 54, the latter being fixed to shaft 56. This shaft is mounted for rotation in a bearing 58 at the top of support 60 in casing 42 and mounted in bearing 62 which is carried by a wall of the casing. The extremity of shaft 56 has a collar 64 on it to prevent longitudinal motion, while the opposite extremity passes through bearing 62 and is located on the exterior of casing 42. Arm 66 is secured at one end to shaft 56 and has a series of holes 68 spaced from each other. A crank pin 70 is fitted in one of the group of holes 68 and is a part of link 72 or is formed separate therefrom, with the link secured to the pin. The previously described enmeshed gears 52 and 54, together with the shafts supporting them and the belt and pulley assembly, constitute means for drivingly connecting electric motor 32 with the arm 66 in order to impart movement thereto whose direction is dependent upon the direction of movement of the reversible electric motor 32. This, in turn, is governed by the position of switch 30. The source of electrical energy for the electric motor 32 is obtained from either the welder 10 or an outside source.

Welder 10 has a control 76 which functions as the means for the person welding to select the amperage with which he is operating. There are many reasons for varying the welding amperage and these are known to men skilled in this field. Accordingly, link 72 has a pin 80 at the end opposite to the connection to arm 66 and the pin is fitted in a selected hole 82 of a group of such holes that are formed in the control 76. By exercising the choice offered in the holes 68 and 82, the throw of the link 72 and arm 66 or/and control 76 is realized. Accordingly, the ratio of movement between motor shaft 34 and control 76 is selectable.

There are means operatively connected with the mechanical drive between motor 32 and arm 66 for preventing over-travel of the arm 66, thereby preventing over-travel of the welder control 76. These means consist of stops 86 and 88 connected respectively to gear 54 and a wall of casing 42, these stops coming into contact with each other to prevent over-travel of the arm 66. As an alternative, or in addition to these stops, there are mechanical stops 90 and 92 carried by the same wall of casing 42 that support shaft 56. Stops 90 and 92 are in the path of travel of the arm 66 and prevent over-travel thereof.

In use, the person who is welding merely operates switch 30 in order to select the amperage setting for the electric welder 10 that he desires. This is achieved through the previously described structure which makes up the attachment for the welder. In addition, should the person who is welding desire to override a setting of the attachment, he may operate crank 94 which is passed through bearing 95 in casing 42 and which has a shaft 96 that is rotated upon rotation of the crank handle 94. Pinion 97 is fixed to shaft 96 and is enmeshed with gear 98, the latter being keyed or otherwise fixed onto shaft 56.

Rotation of the crank handle 94 will, therefore, operate the means for setting the amperage control 76.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An attachment for an electric welder that has a control thereon, said attachment comprising a casing, a reversible electric motor in said casing, a switch arranged in circuit with said electric motor to operate said motor in either direction, a shaft mounted for rotation in said casing and having an end protruding therefrom, an arm fixed to said shaft, a link, means for connecting said link to said arm in selected positions on said arm, said link being connected to an amperage control whereby upon actuation of said arm the travel of said amperage control may be selected, mechanical means drivingly connecting said electric motor with said shaft, manually operable means carried by said casing and operatively connected with said shaft for overriding said motor in order to manually select a setting of said amperage control, the welder having a cable extending therefrom, a welding rod holder operatively connected on said cable, said switch being carried by said welding rod holder, an electrical conductor extending from said switch in said welding rod holder to said motor in said casing, said mechanical means including a first gear on said shaft, a spindle intermediate said shaft and said motor, an intermediate gear on said spindle meshed with said first gear, a first pulley on said spindle, an axle projecting from said motor, a second pulley on said axle, a belt disposed about and drivingly engaging said first and second pulleys whereby a drive between said motor and said shaft is provided, said manually operable means including a second gear on said shaft, a drive gear meshed with said second gear, a crank connected to said drive gear for actuating the latter and thus turning said shaft whereby said first gear drives said intermediate gear which causes said first pulley to turn and slip beneath said belt so that said manually operable means may override the motor.

References Cited in the file of this patent

UNITED STATES PATENTS

| | | |
|---|---|---|
| 1,168,533 | Meyer | Jan. 18, 1916 |
| 2,438,634 | Farrow | Mar. 30, 1948 |
| 2,484,421 | Moore | Oct. 11, 1949 |
| 2,488,171 | Campbell | Nov. 15, 1949 |
| 2,526,597 | Winslow | Oct. 17, 1950 |
| 2,686,239 | Burbeck | Aug. 10, 1954 |